July 15, 1924.
A. W. DUBE
1,501,707
PROCESS OF AND APPARATUS FOR MAKING CONCRETE WALLS
Filed April 1, 1922 2 Sheets-Sheet 1
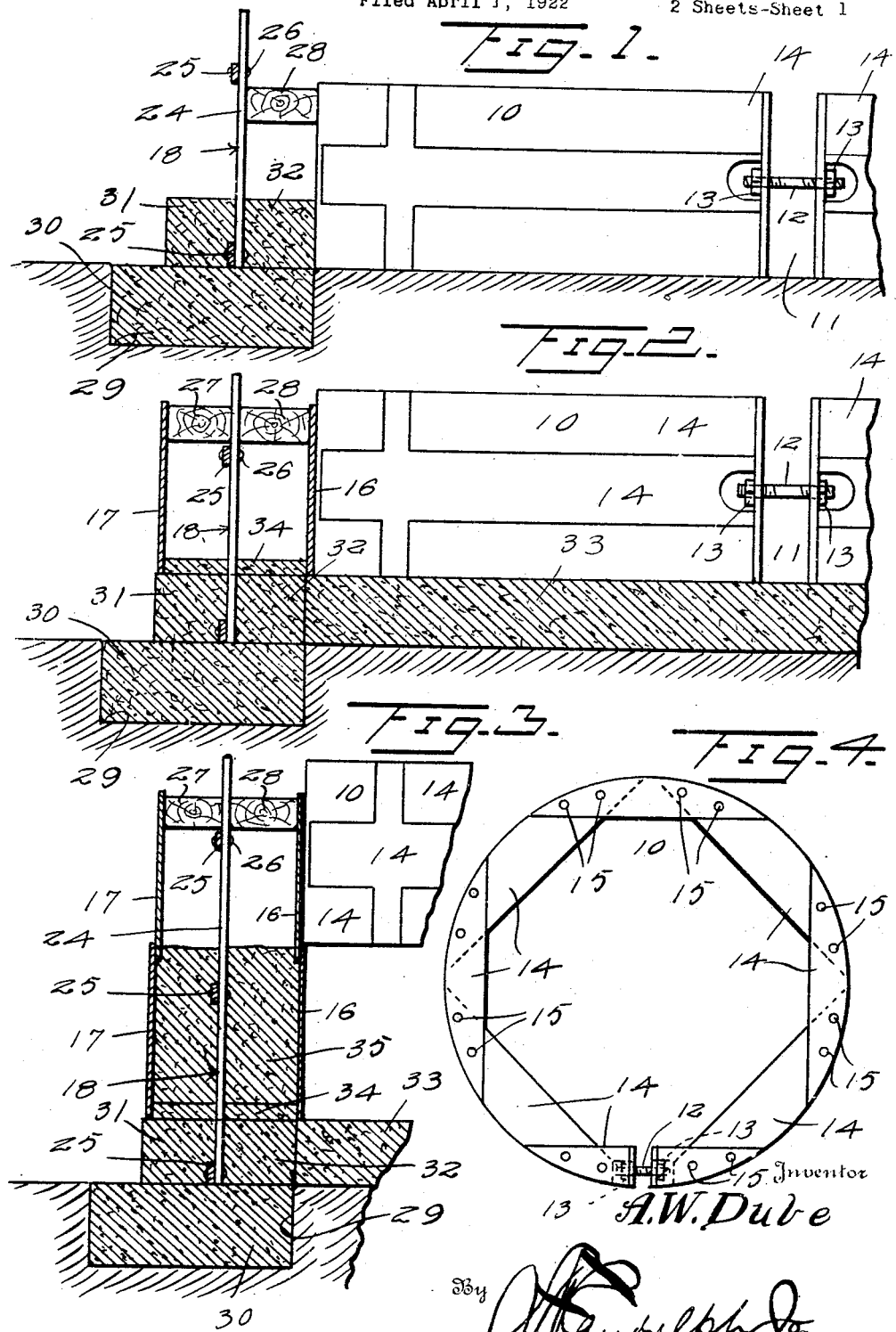

July 15, 1924.
A. W. DUBE
1,501,707
PROCESS OF AND APPARATUS FOR MAKING CONCRETE WALLS
Filed April 1, 1922     2 Sheets-Sheet 2
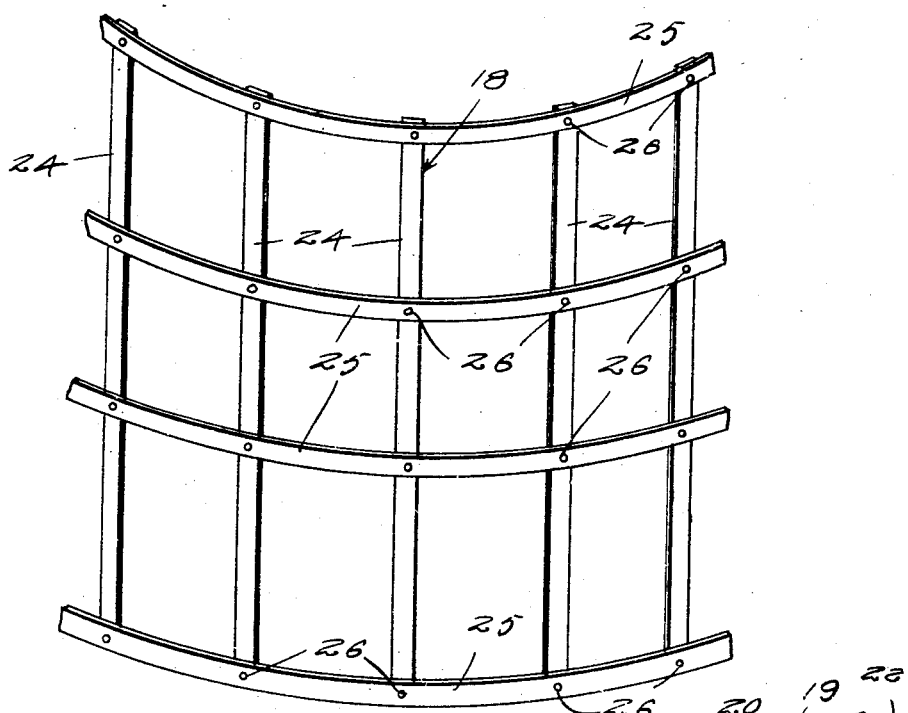
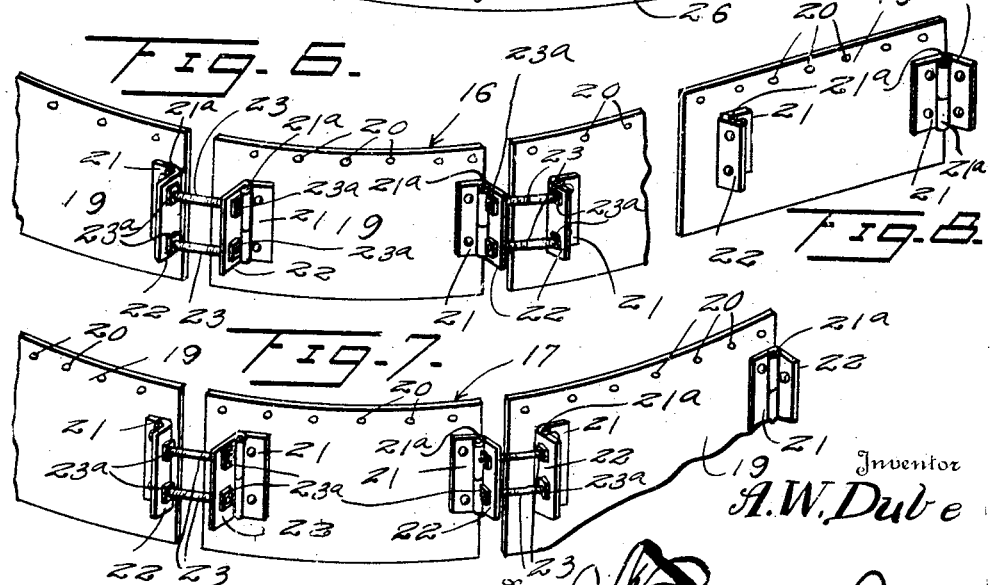

Patented July 15, 1924.

1,501,707

UNITED STATES PATENT OFFICE.

AUGUST W. DUBE, OF LEXINGTON, TEXAS.

PROCESS OF AND APPARATUS FOR MAKING CONCRETE WALLS.

Application filed April 1, 1922. Serial No. 548,671.

*To all whom it may concern:*

Be it known that I, AUGUST W. DUBE, a citizen of the United States, residing at Lexington, in the county of Lee and State of Texas, have invented certain new and useful Improvements in a Process of and Apparatus for Making Concrete Walls; and I do hereby declare the following to be a full, clear, and exact description of the invention, such as will enable others skilled in the art to which it appertains to make and use the same.

This invention relates to a mold apparatus and process for the erection of concrete structures.

The invention aims to provide a novel mold means for use in erecting endless walls of concrete as for a cistern, tank or silo, which consists of few, inexpensive, durable, knockdown and readily portable parts.

It is also aimed to provide a mold apparatus having a cooperating core, two inner mold sections, two outer mold sections and a reinforcing frame, which may build such a wall of any desired height.

Another object is to provide a reinforcing frame for the wall which may be constructed of bars or strips of metal readily attachable together for cooperation with a core to impart the requisite shape thereto.

Still another object is to provide a mold apparatus having mold sections which may consist of flat bendable sheets normally and which are attachable in endless formation and cooperate with the core to impart requisite shape thereto.

A further object is to provide a mold apparatus in which the core is expansible and contractile to cooperate with the remaining structure and in which blocks may be interposed between the frame and mold sections to assist in the placing and shaping of the parts.

Additional objects and advantages will become apparent from a consideration of the description following taken in connection with accompanying drawings illustrating one practical embodiment.

In said drawings:—

Figures 1, 2 and 3 are vertical sections, taken fragmentarily through a wall in the process of construction and at different places, with the parts of the mold apparatus in place;

Figure 4 is a top or plan view of the core;

Figure 5 is a fragmentary perspective view of the reinforcing frame which may be embedded in the wall;

Figure 6 is a detail perspective view of one of the inner mold sections;

Figure 7 is a detail perspective view of one of the outer mold sections, and

Figure 8 is a detail perspective view of one of the plates used in the formation of the mold sections.

Like reference characters designate like or similar parts in the different views.

In reducing the invention to practice, a suitable core is provided at 10, which may be cylindrical as shown. The core 10 is split as at 11 to permit contraction and expansion of the core through actuation of one or more bolts 12 having nuts 13 associated therewith. The core may be constructed in any suitable manner but preferably consists of wooden blocks or sections 14 detachably bolted or otherwise secured together as at 15. The detachability of the sections 14, enables the core to be knocked down to occupy small space during transportation.

Adapted to surround the core 10 during the construction of a wall, are two inner mold sections 16, being cylindrical or endless in operative form. Two outer mold sections 17 of greater diameter and adapted to surround the inner mold sections 16 are provided and disposable in the space intermediate the inner and outer mold sections is a reinforcing frame 18 to be embedded in the walls to be built.

Both the inner and outer sections 16 and 17 are primarily made up from a plurality of flat metallic sheets or blanks as detailed in Figure 7, which are flexible or bendable to assume an arcuate shape. Each of the plates or sections 19 may be provided with a row of openings or the equivalent as at 20, for engagement with apparatus designed to lift or vary the position of the plates.

In addition, the plates 19 have cleats 21 which may be disposed transversely thereof and secured thereto. It is obvious that if desired, four nuts 13 may be used on each of the bolts 12.

The cleats have outwardly extending leaves 22 through which bolts 23 may be adjustably and detachably fastened. Due to the fact that the plates 19 are bendable, they may assume flat form during transportation and the plates are also detachable from each other through removal of the bolts 23. Said leaves 22 are hinged to the remainder of the cleats 21 as at 21ᵃ in order to render the form more pliable and to enable the cleats to swing back so as to occupy minimum space in transportation. The nuts of bolts 23 are engaged at 23ᵃ and are used four on each bolt so as to engage both sides of leaves 22.

Reinforcing frame 18 may be of any suitable construction. It is however preferably provided from a plurality of elongated straight metallic bars or strips 24 and 25. The strips 24 remain straight and the strips 25 assume annular or ring formation and enclose the bars or strips 24. Fastening means such as bolts 26 may connect the bars 24 and 25 together. As a result of this construction, a specially shaped or built reinforcing frame does not have to be furnished for each job. The contractor or builder can readily make up the frame 18 from a plurality of strips or bars 24 and 25 to the substantially cylindrical or other form desired. The necessary cylindrical form for the frame 18, and the inner and outer mold sections 16 and 17 is imparted from the core 10 in combination with blocks of wood or otherwise designated 27 and 28 and separate therefrom.

The method of using the apparatus and the process of constructing a wall will now be described. An annular foundation as of concrete is provided in a suitable trench for instance at 29, the concrete or foundation being designated 30. Disposed on the concrete 30 is the said frame 18 which is to be embedded in the wall to be built. Said frame 18 may be disposed nearer the inner edge of the foundation 29 than the outer edge of the foundation 29 so as to be centrally or otherwise disposed within the wall proper. After the foundation 30 is laid, courses of concrete 31 and 32 are laid on opposite sides of the frame, the core 10 being disposed within the frame and the blocks 28 being disposed between the core and the frame 18 so as to impart an annular or round shape to the frame so that the frame will be concentric with the core. It is understood that the blocks 28 are placed in wedge or friction tight relation with the frame 18 and if necessary, the tightness thereof may be increased through adjustment of the bolt 12. Through adjustment of said bolt 12 in the opposite direction, the blocks 28 may be loosened to facilitate removal. After the courses 31 and 32 are laid, another course as at 33 is laid interiorly of the course 32, preferably flush with its top and shown in Figure 2. After the course 33 is laid, the core 10 is again used, being placed on said course 33, and one of the mold sections, as shown in Figure 3, is disposed intermediate the core and frame 18 while the other mold section is disposed exteriorly of the frame 18. The wedges of the blocks 27 and 28 are now used as shown in Figure 2 to properly space the mold sections from the frame 18 and impart the annular or round shape of the core 10 thereto. Blocks 27 and 28 are first disposed relatively close to the bases of said mold sections to facilitate the laying of a relatively shallow layer or course 34 on the courses 31 and 32. After course 34 is laid, the blocks 27 and 28 are preferably moved adjacent the upper edges of the sections 16 and 17 so as to better shape them. As shown in Figure 3, the space between the sections 16 and 17, is filled by a course of concrete as at 35 arranged on the course 34. Before the course 35 is set, the blocks 27 and 28 are removed and the additional inner and outer mold sections 16 and 17 are arranged as in Figure 3, overlapping the walls of the lowermost sections 16 and 17. The blocks 27 and 28 may be engaged with the uppermost sections 16 and 17 and frame 18 while the core 10 may be elevated to better cooperate with the said uppermost sections 16 and 17. The course of concrete may then be poured into the space between the uppermost sections 16 and 17 onto the course 35. Thereafter, the lowermost sections 16 and 17 may be detached and elevated for superimposed relation with the outer mold sections. This use of the sections 16 and 17 for elevation alternately and step by step enables a wall to be built of any desired height by using merely two sets of the inner and outer mold sections.

It will be understood of course that all of the various courses 30, 31, 32, 33, 34 and 35 are of concrete or the like and applied to each other before setting, so that the wall will be practically an integral unit.

As merely one practical embodiment of the invention has been illustrated and described, it is to be understood that changes in the details may be resorted to, provided they fall within the spirit and scope of the invention.

I claim as my invention:—

1. A mold apparatus consisting of inner and outer walls of different diameters, said walls being in adjustable parts whereby they may slide one above the other and be alternately arranged uppermost and lowermost detachable fastenings for said parts, and cleats engaged by said fastenings foldably connected to said parts.

2. A mold apparatus consisting of inner and outer walls of different diameters, said walls being in adjustable parts whereby they may slide one above the other to be alternately arranged uppermost and lowermost, said parts having cleats foldably hinged thereon, and bolts detachably connecting the cleats.

3. A mold apparatus consisting of a wall in adjustable parts, said parts having cleats, bolts connecting the cleats and detachable therefrom, and said cleats being pivotally connected to the parts whereby they may be folded against the parts in the absence of the bolts.

4. The process of constructing a wall consisting in arranging a mold means about a reinforcing frame for the wall, applying spacing means intermediate the mold means and the frame at the base thereof, in laying a course of concrete within the mold means to position the mold means at the base thereof, in then raising the spacing means to position the mold means at the top thereof, and in laying a course of concrete on the said course of concrete.

5. The process of constructing a wall consisting in arranging a reinforcing frame for the wall with a core enclosed thereby and spaced therefrom, in laying a course of concrete intermediate said core and frame and outside of the frame, in elevating said core, in providing mold means about said core and enclosing said frame, applying spacing means intermediate the mold means and frame at the base thereof, in laying a course of concrete within the mold means, and which course positions the mold means at the base thereof, in then raising the spacing means to position the mold means at the top thereof, and in laying a course of concrete on the second mentioned course.

In testimony whereof I affix my signature in presence of two witnesses.

AUGUST W. DUBE.

Witnesses:
G. R. MIERTSCHIN,
W. E. MARBURGER.